Patented Nov. 20, 1945

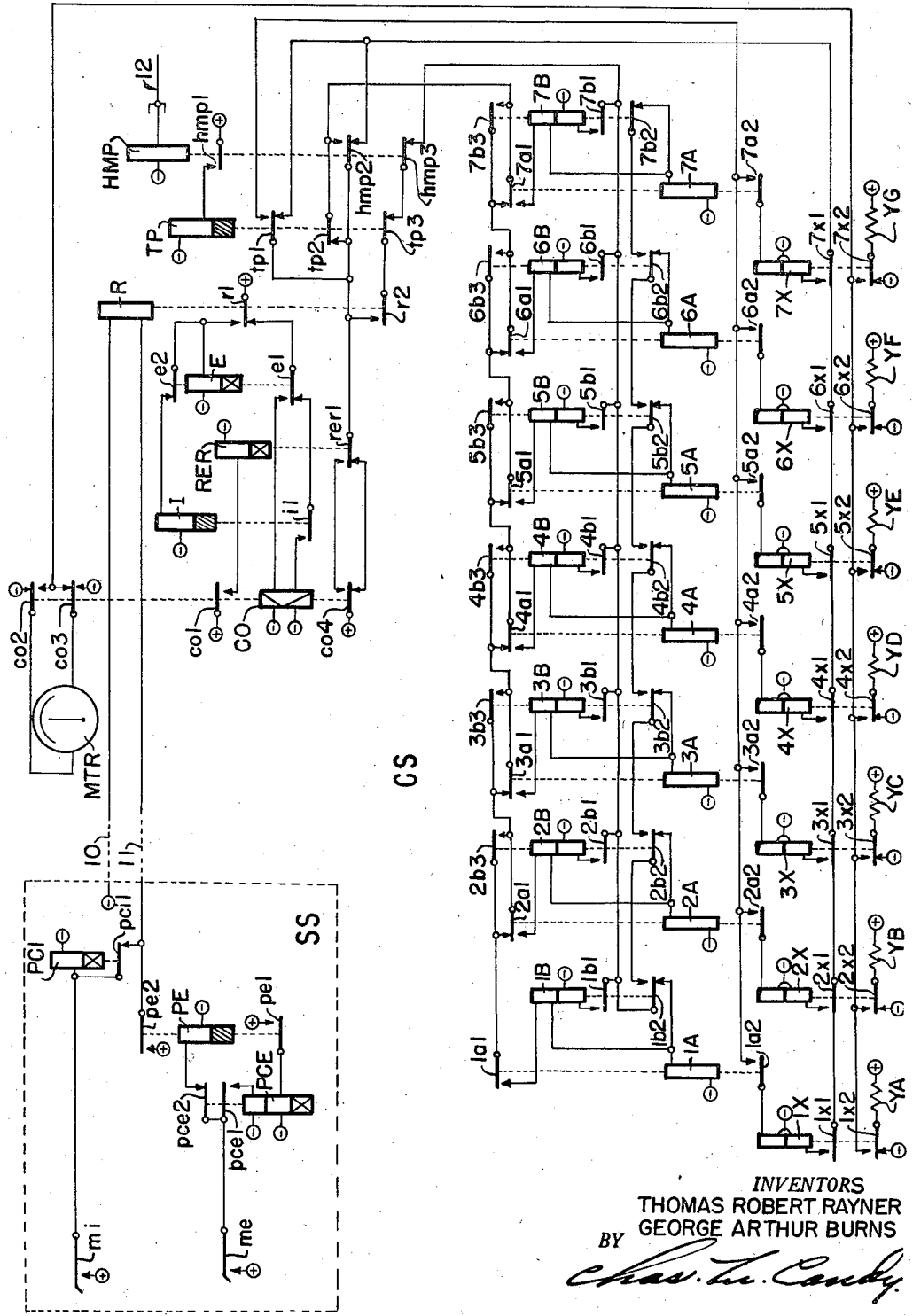

2,389,275

UNITED STATES PATENT OFFICE 2,389,275

TELEMETERING ARRANGEMENT

Thomas Robert Rayner, Wallasey, and George Arthur Burns, Liverpool, England, assignors, by mesne assignments, to Automatic Electric Laboratories, Inc., Chicago, Ill., a corporation of Delaware Application August 14, 1942, Serial No. 454,772
In Great Britain November 20, 1941

14 Claims. (Cl. 177—351)

The present invention relates to telemetering arrangements and is more particularly concerned with systems for remotely indicating the readings of meters in accordance with the number of impulses transmitted in a predetermined time.

In connection with electric power generation and distribution systems where remote indication of readings of power are required, it has already been proposed to make use of an energy meter connected in the power circuit concerned, which may also include a power meter for local indication. From the moving spindle of the energy meter impulses are generated in accordance with the energy registered, and are transmitted over a line to the point where the remote indication is required, it being appreciated that the rate of transmission will be directly proportional to the average power in the circuit concerned. At the receiving point apparatus is provided for measuring the rate at which the impulses are received and from this information the average power concerned at the transmitting point can be determined and indicated. The chief object of the invention is to provide a simple, accurate and efficient remote indicating system of the above described type in which use can be made of apparatus requiring a minimum of maintenance.

According to the invention, in a telemetering arrangement of the type having a meter reading indicated at a distant point in accordance with the number of impulses transmitted in a predetermined time, the impulses serve to operate a counting relay chain of the type involving considerably fewer relays than the maximum number of impulses catered for, the setting of which at the end of the period is displayed on a suitable indicating instrument.

The invention will be better understood from the following description of one method of carrying it into effect, reference being had to the accompanying drawing which shows circuits of apparatus suitable for indicating at a central electric power station the total power import or export, as the case may be, at an associated substation.

For this purpose a counting relay chain resettable at periodic intervals and comprising relays 1A—7A and 1B—7B is employed at the central station CS and long or short impulses are transmitted over the line 10, 11 from the substation SS dependent upon whether export or import power readings are involved. Contacts *mi* and *me* are provided respectively on energy meters associated with the import and export power circuits at the substation, and by the action of relays PCI, PCE and PE, the closing of contacts *mi* causes short pulses to be transmitted over the line 10, 11 to the station CS, while the closing of contacts *me* causes long impulses to be transmitted. Where a number of power circuits of the same kind are involved, the contacts *mi* and/or *me* will be those provided on summators which in known manner are adapted to integrate the readings of the associated individual energy meters. It will be understood that in response to a series of short "import" impulses the central station centre-zero receiving ammeter movement MTR, on which the remote power indication is displayed is caused to operate over the "import" half of its scale, while if long "export" impulses are received the connections to this meter are reversed so that its pointer will operate over the "export" half of its scale.

Regarding the nomenclature of the various relays employed in the circuit, it may be explained that a slow-to-release relay such as relay I, is shown with a hatched portion at one end of the representing rectangle, while a slow-to-operate relay such as relay E having a copper slug at the armature end of its core is shown with a cross at one end, such a relay being generally slow-to-release as well as slow-to-operate.

For the purpose of the description it will first be assumed that import power readings are being signalled from the substation SS in which case each time contacts *mi* close in response to a given number of kilowatt-hours of import energy, say twenty, an impulse is delivered over the line 10, 11 dependent in length on the operating time of relay PCI. In response thereto relay R operates and on its first energisation relay I operates quickly and at its contacts *i1* prepares a circuit for the lower winding of relay CO. In this case the length of the impulse is insufficient to allow the slow-to-operate relay E to operate and at the end of the impulse when relay R releases a circuit is completed for the lower winding of relay CO, which circuit will be maintained for the releasing time of relay I. Relay CO is of the so-called magnetic locking type for instance as disclosed in United States Patent No. 2,270,966, Rayner et al., granted January 27, 1942, and is provided with a permanent magnet which serves to retain the relay armature in either a normal or operated position after a setting operation depending upon which of its two windings has been energised. When the lower winding of relay CO is energised on the release of relay R, its contacts will remain in the position in which they are shown if that is the position already occupied by them; but if they are in an operated position owing to the previous energisation of its upper winding, then they will be moved to the position in which they are shown. In either case, they will subsequently remain in this position until the upper winding of relay CO is again energized with contacts co2 and co3 as shown the meter pointer will be caused to operate on the "import" half of its scale. Subsequent "import" impulses will reoperate relays R and I but relay E will remain inoperative and relay CO will thus continue in normal position.

Considering now the operation of the counting chain relays, it will be seen that the first time contacts r2 of relay R close, relay 1A is operated and at its contacts 1a1 prepares an energising circuit for relay 1B by way of its upper winding which is at present short-circuited. At the end of the impulse when relay R releases, the short-circuit is removed from relay 1B which now operates in series with relay 1A which is maintained operated. Relay 1B at contacts 1b1 prepares a holding circuit for itself over its lower winding and at contacts 1b2 prepares an operating circuit for relay 2A. On the second impulse the closing of contacts r2 brings up relay 2A which at its contacts 2a1 prepares a circuit for relay 2B and opens the series circuit for relays 1A and 1B whereupon relay 1A is released but relay 1B remains held over its lower winding. At the end of the second impulse, relay 2B operates in series with relay 2A which remains energised and relay 1B now releases since its holding circuit is opened at contacts r2. Relay 1B on releasing again prepares the operating circuit for relay 1A while relay 2B at contacts 2b3 prepares the locking circuit. Hence at the beginning of the third impulse, relay 1A reoperates and at the end of this impulse relay 1B operates in series with relay 1A which remains operated. During this time relays 2A and 2B remain held in series and hence at the end of the third impulse, an operating circuit is prepared over operated contacts 1b2 and 2b2 and normal contacts 3b2 for relay 3A. This relay operates on the fourth impulse and at contacts 3a1 releases relays 1A and 2A, relays 1B and 2B remaining held over their right-hand windings until the end of the impulse whereupon they are released and relay 3B operates in series with relay 3A. On the fifth impulse relay 1A is operated in addition to relay 3A, on the sixth impulse relay 2A is operated in addition to relay 3A and relay 1A is released, while on the seventh impulse relay 1A is operated in addition to relays 3A and 2A. The associated B relays now prepare a circuit for relay 4A which on operating on the eighth impulse releases the preceding relays 1A, 2A and 3A. The cycle of operations continues in a manner which will be readily followed and it will be seen that on the fifteenth impulse relays 1A, 2A, 3A and 4A are operated and a circuit is prepared for relay 5A. Relay 5A in operating on the sixteenth impulse resets the preceding relays and so on.

By this arrangement it is possible to count up to a total of 127 pulses with seven pairs of relays only and the following condensed table enables the particular A relays which are operated in response to any given number of impulses up to the maximum catered for to be readily ascertained. The A relays have been chosen rather than the B relays since it is these A relays which control the setting of the X relays which determine the reading which is to be set upon the meter MTR at the end of each predetermined time period. The operation of the B relays however always bears a similar relation to that of the A relays, both energisation and release taking place slightly later but responsive to the same number of impulses.

| Impulse | "A" relay operated |
| --- | --- |
| 1 | 1A. |
| 2 | 2A. |
| 3 | 2A, 1A. |
| 4 | 3A. |
| 5 | 3A, 1A. |
| 6 | 3A, 2A. |
| 7 | 3A, 2A, 1A. |
| 8 | 4A. |
| 16 | 5A. |
| 32 | 6A. |
| 64 | 7A. |
| 96 | 7A, 6A. |
| 112 | 7A, 6A, 5A. |
| 120 | 7A, 6A, 5A, 4A. |
| 124 | 7A, 6A, 5A, 4A, 3A. |
| 126 | 7A, 6A, 5A, 4A, 3A, 2A. |
| 127 | 7A, 6A, 5A, 4A, 3A, 2A, 1A. |

At the end of each counting period a time pulse received over lead 12, Fig. 1, operates relay HMP which in turn brings up relay TP. At contacts hmp2 the holding circuit for the various A and B relays which are operated is maintained, while at contacts hmp3 the impulsing circuit to the counting chain is opened. On the operation of relay TP, the holding circuit for the various X relays which have been held operated during the counting period under review is opened at contacts tp1, while at the same contacts an operating circuit is completed for the X relays corresponding to the particular A relays which have now been operated. For instance, if sixty-five pulses have been received, relays 1A and 7A will be operated, and hence relays 1X and 7X will be operated over their upper windings via contacts 1a2 and 7a2 respectively. Relays 1X and 7X at contacts 1x2 and 7x2 complete a current flow circuit for the meter MTR via resistors YA and YG in parallel. The resistors YA—YG are so proportioned that the current which flows through meter MTR with resistor YA in series therewith is doubled with resistor YB in series, doubled again with resistor YC in series and so on. Hence if the resistance of the meter MTR is negligible compared with that of the resistors, the resistance values represent successive powers of 2, the resistance of YG being the smallest. The meter MTR which comprises an ammeter movement has a scale conveniently calibrated in kilowatts in such manner that for one unit of current flow therethrough the meter will show a reading representing the number of average kilowatts corresponding to the transmission of one 20 kilowatt-hour impulse during the predetermined counting period, e. g., if the period equals half a minute the average power involved will be 240 kilowatts. In the present instance with relays 1X and 7X operated, the current flow through the meter will equal sixty-five units and a reading of $20 \times 65 \times 120 = 156,000$ kilowatts will therefore be given.

At the end of the time pulse period, relay HMP releases whereupon relay TP commences to release slowly due to its slug. During the slow release time of relay TP, the holding potential is removed from the counting chain relays and relays 7A, 7B, 1A and 1B which are assumed to have been operated are released and the counting chain is now restored to normal ready to count a further set of pulses. On the release of relay TP the holding circuit is again prepared at contacts tp2 and at contacts tp1 the operating circuit for the relays 1X—7X is opened, the holding circuit for the particular relays of this group which have been operated being previously completed on the release of relay HMP. The impulsing circuit is again completed at contacts *hmp3* and *tp3* when relays HMP and TP have both released.

Similar remarks apply in connection with subsequent impulse trains of the same type as described, the meter indication being changed at the end of each counting period if any change occurs in the average power import to the substation during each time period involved.

Assuming now that the substation commences to export power instead of to import power, contacts *me* at the substation will come into operation and on their first closure will energise relay PE. Relay PE on operating, at contacts *pe1* completes an energising circuit for the lower winding of relay PCE and at contacts *pe2* applies positive to line 11. On the operation of relay PCE after its slow period, the operating circuit for relay PE is disconnected at contacts *pce2* and relay PCE locks to *me* over contacts *pce1* and its upper winding. After the slow release period of relay PE the impulse to line is terminated and it will be seen therefore that "export" impulses are appreciably longer than "import" impulses. The effect at the central station is that relay R is operated for a sufficiently long time on each impulse to bring up the slow-to-operate relay E. Relay E thereupon at its contacts *e1* prepares an energising circuit for the upper winding of the magnetic locking relay CO and at contacts *e2* disconnects relay I to prevent the energisation of the lower winding of relay CO when both relays R and E subsequently release. At the end of the impulse a circuit is therefore completed for the upper winding of relay CO during the slow release time of relay E. Relay CO will accordingly change over its contacts to the operated position, in which position they will remain until such time as "import" impulses are again received. Relay CO in operating, at its contacts *co2* and *co3*, reverses the connections to the meter MTR so that the pointer will subsequently operate over the "export" half of its scale, while at contacts *co1* relay RER is energised. It will be seen that during the slow operate period of relay RER with contacts *co4* in an operated position the impulsing and holding circuits for the relay counting chain are opened, while the holding circuits for the meter indication relays 1X—7X are also opened so that all relays restore to normal and the meter pointer takes up a central position. On operation of relay RER, contacts *rer1* re-complete the impulsing and holding circuits for the counting relay chain and this chain commences to respond to the "export" impulses in the usual manner.

When the next time pulse is received, the information on the counting chain is transferred to the relays 1X—7X which set up a reading on the meter as previously described. It will be appreciated that in this instance, since the impulses have not been counted over a complete counting period, the first reading given by the meter after the changeover from one kind of signal to another will not be quite accurate and this point will of course be taken into account by the person responsible for observing the meter readings. It has been found, however, that in most cases this occasions no difficulty in practice.

The same remarks apply in connection with a changeover from "export" to "import" readings, it being seen that during the slow release time of relay RER the counting and storing relays are restored to normal and the meter indication set to zero.

It will be noticed that current flows through the resistors YA—YG whether the associated X relays are operated or not, the arrangement being that the current flow circuit includes the meter MTR if the relays are operated. This arrangement ensures that the current drain on the source remains substantially constant under all conditions thus permitting close control of the voltage of this source. It will be appreciated that variations in this voltage would produce corresponding changes in the readings of the meter and hence inaccuracy would be introduced. It might be found desirable in practice to supply the meter current from a source separate from that feeding the counting relay chain which represents a variable load.

The arrangement described may readily be extended or reduced to cover the counting of any desired maximum number of impulses in a given period by the provision of the proper number of A, B and X relays. It is of course necessary in all cases to ensure that the maximum impulsing speed does not exceed the response capabilities of the counting relay chain.

What we claim as new and desire to secure by Letters Patent is:

1. In combination with a system wherein energy is transmitted at a variable rate, a telemetering circuit, means controlled by said transmission of energy for transmitting electrical impulses over said circuit at a rate depending upon the rate of said transmission of energy, an indicating instrument, means associated with said circuit for receiving said impulses and causing said instrument to display an indication depending upon the number of impulses which have been received during an elapsed predetermined interval of time, means for maintaining said display unchanged throughout a subsequent invariable interval of time regardless of the number of impulses transmitted over said circuit during such subsequent interval, and means operated automatically at the end of said subsequent interval of time to wipe out said display.

2. In a telemetering system, a circuit over which electrical impulses are transmitted sometimes at regular intervals and other times at irregular intervals, means for registering said impulses, means operated at regular intervals thereby to measure off successive equal periods of time, an indicator controlled conjointly by said first two means for displaying, throughout each of said periods, an indication commensurate with the number of impulses registered during the preceding period, and means operated at the end of each said period to wipe out the indication displayed throughout that period.

3. In a telemetering system, a circuit over which impulses are transmitted at a variable rate during a predetermined period of time, means for registering the impulses transmitted during said period upon a relay chain comprising considerably fewer relays than the number of impulses registered, an indicating instrument, and means controlled by said relay chain at the end of said period for causing said instrument to display an indication varying in accordance with the number of impulses registered.

4. In a telemetering system, an indicating instrument, a plurality of resistors, a signalling path over which impulses are transmitted at random intervals, a relay chain for registering said impulses, means for measuring off a predetermined period of time, an operating circuit for said instrument, means operated at the end of said period for completing said circuit, and means controlled by said relay chain for connecting in said circuit a variable combination of said resistors depending upon the number of impulses registered during said period, thereby to control said instrument's operation.

5. In a telemetering system, a signalling path over which impulses are transmitted at random intervals, means for registering said impulses, means operated at regular intervals thereby to measure off successive equal periods of time, an indicating instrument, a circuit for operating said instrument throughout each of said periods, and means controlled conjointly by said first two means for connecting, in said instrument circuit throughout each period, resistance of a value depending upon the number of impulses registered during the immediately preceding period.

6. In a telemetering system, an ammeter, a source of current for said ammeter, a signalling circuit over which impulses are transmitted at a variable rate, time controlled means for registering the impulses transmitted over said circuit during a measured period of time, and means controlled by said last means for connecting said source to said ammeter only at the end of said period over resistance of a value depending upon the number of impulses registered during said period.

7. In combination with a system wherein energy is transmitted at a variable rate in either of two directions, a telemetering circuit, means controlled by said transmission of energy for transmitting over said circuit, at a rate depending upon the rate of said transmission of energy, impulses whose character depends upon the direction in which said energy is transmitted, an indicating instrument, and means associated with said circuit for receiving said impulses and causing said instrument to display an indication depending both upon the number and character of impulses which have been received during an elapsed predetermined interval of time.

8. In a telemetering system, a signalling path, means for transmitting electrical impulses of a certain character over said path at random intervals during a predetermined period of time, means for transmitting electrical impulses of a different character over said path at random intervals during another predetermined period of time, means associated with said path for registering said impulses, an indicator having a normal position, means controlled by said registering means for causing said indicator at the end of each said period to move from its normal position a distance depending upon the number of impulses registered during that period, and other means controlled by said registering means for controlling the direction which said indicator moves from its normal position at the end of each said period in accordance with the character of the impulses registered during that period, whereby said indicator moves in one direction after said first period and in a different direction after said other period.

9. In a telemetering system, a signalling path, means for transmitting electrical impulses of a certain character over said path at random intervals during a predetermined period of time, means for transmitting electrical impulses of a different character over said path at random intervals during another predetermined period of time, means associated with said path for registering said impulses, an indicator having a normal position, a circuit for said indicator completed at the end of each said interval, means for altering the connections of said circuit to said indicator in accordance with the character of the impulses registered, whereby said indicator moves in one direction from its normal position at the end of said first period and in a different direction at the end of said other period, and means for connecting to said circuit at the end of each said period resistance of a value depending upon the number of impulses registered during that period thereby to control the distance that said circuit causes said indicator to move from its normal position.

10. In a telemetering system, a signalling path, means for transmitting impulses of a certain character over said path at random intervals, means for transmitting impulses of a different character over said path at random intervals, means associated with said path for registering the character of the impulses transmitted thereover, a relay chain also associated with said path for registering the number of impulses transmitted thereover, an indicator having a normal position, time controlled means for causing said indicator to move from its normal position a distance depending upon the number of impulses registered by said relay chain in a predetermined interval of time, said character registering means effective to control the direction in which said indicator moves from its normal position in accordance with the character of the impulses registered during said predetermined interval.

11. In a telemetering system as claimed in claim 10, means controlled by said character registering means to cancel the registeration on said relay chain responsive to a change in the character of the impulses transmitted over said path if said change occurs during said predetermined interval of time.

12. In a telemetering system, a signalling path, means for transmitting impulses of a certain character over said path at random intervals, means for transmitting impulses of a different character over said path at random intervals, means associated with said path for registering the character of the impulses transmitted thereover, a relay chain also associated with said path for registering the number of impulses transmitted thereover, means operated at regular intervals thereby to measure off successive equal periods of time, an indicator having a normal position, and means controlled conjointly by said character registering means and said relay chain for normally causing said indicator to occupy throughout each said period a position displaced from its normal position a distance depending upon the number of the impulses registered during a preceding period, such displacement being in a direction depending upon the character of the impulses registered during said preceding period.

13. In a telemetering system as claimed in claim 12, means controlled by said character registering means whenever any impulse is of a different character than the preceding impulse for causing said indicator to assume its normal position immediately.

14. In a telemetering system, a signalling path, means for transmitting impulses of a certain character over said path at random intervals, means for transmitting impulses of a different character over said path at random intervals, means associated with said path for registering the character of the impulses transmitted thereover, a relay chain also associated with said path for registering the number of impulses transmitted thereover, an ammeter, a source of current, means operated at regular intervals thereby to measure off successive equal periods of time, means controlled by said relay chain for connecting said source to said ammeter, throughout each of said periods, through resistance of a value depending upon the number of impulses registered during the immediately preceding period, and means whereby the polarity of said source with respect to said ammeter in said connection depends upon the character of the impulses registered during said preceding period.

THOMAS ROBERT RAYNER.
GEORGE ARTHUR BURNS.